W. T. ORR.
Corn-Harvester.
No. 161,149. Patented March 23, 1875.
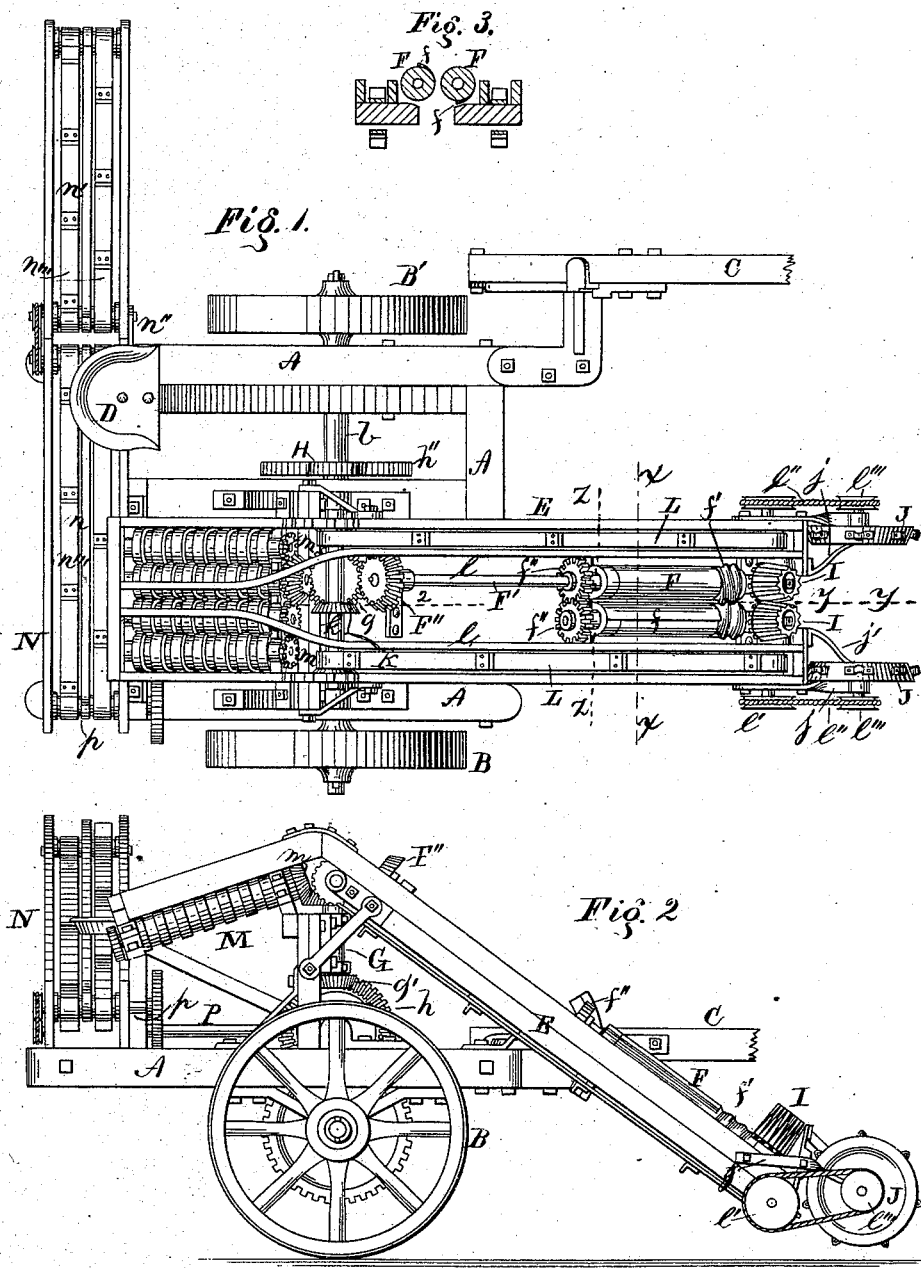
WITNESSES
INVENTOR
William T. Orr
By W. B. Richards, Atty.

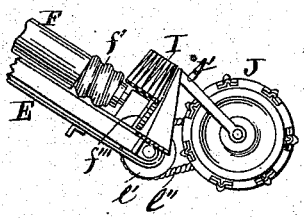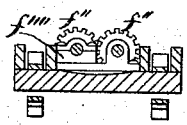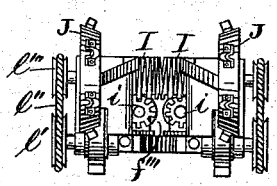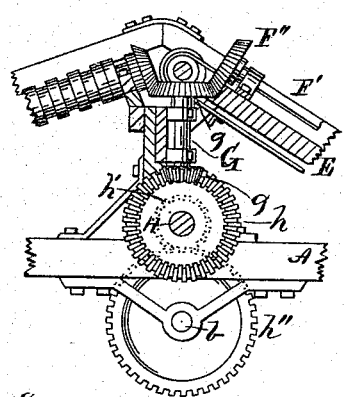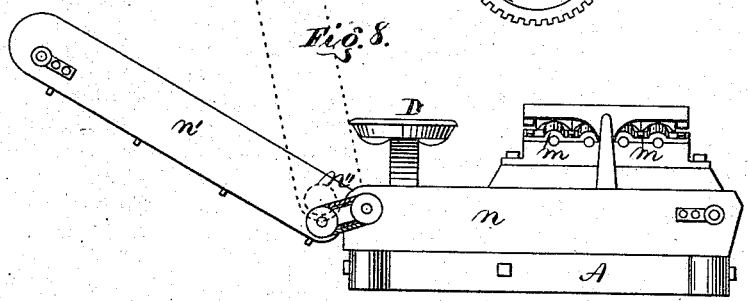

UNITED STATES PATENT OFFICE.

WILLIAM T. ORR, OF KEWANEE, ILLINOIS.

IMPROVEMENT IN CORN-HARVESTERS.

Specification forming part of Letters Patent No. 161,149, dated March 23, 1875; application filed January 2, 1875.

*To all whom it may concern:*

Be it known that I, WILLIAM T. ORR, of Kewanee, county of Henry and State of Illinois, have invented certain Improvements in Corn-Harvesting Machines, of which the following is a specification:

The nature of my invention relates to improvements in that class of corn-harvesting machines which are intended to pull the corn from the stalks in the field, and husk the ears and deposit them in a wagon or other receptacle, as the machine is drawn through the field; and the invention consists in a new and improved combination of devices, consisting of peculiarly-constructed rollers for gathering the stalks, corrugated feeding-rollers, and rollers for pulling the ears from the stalks, operating as hereinafter more fully set forth.

In the accompanying drawing, forming part of this specification, and illustrating my invention, Figure 1 is a top-plan view of a machine embodying my invention. Fig. 2 is a side elevation. Fig. 3 is a sectional view of Fig. 1 on the line $x\ x$. Fig. 4 is a detail sectional view on the line $y\ y$ in Fig. 1. Fig. 5 is a sectional view of Fig. 1 on the line $z\ z$. Fig. 6 is an elevation of the extreme forward parts of Fig. 1. Fig. 7 is a detail vertical sectional view on the line 2 2 in Fig. 1. Fig. 8 is an elevation of the rear part of the machine.

Referring to the parts by letters, letter A represents a rectangular frame, supported on wheels B B'. C is the tongue, pivoted to the frame A. D is the driver's seat. E is an inclined forward part of the machine, carrying in suitable bearings the pulling-rollers F F. Each roller F has an enlargement, $f$, on one side, (see Fig. 3,) and has a spiral groove, $f'$, at its lower end, (see Fig. 1,) and gear-wheels $f''$ at its upper end, and pinions $f'''$ at its lower end.

The distance between the rollers F may be adjusted by an adjustable bearing-block, $f^4$. The upper end of one of the rollers F carries a shaft, F', with a pinion, F'', on its upper end, gearing with a pinion, $g$, on a shaft, G, with a pinion, $g'$, on its lower end, which gears with a pinion, $h$, on a shaft, H, which carries a pinion, $h'$, gearing with the main drive-wheel $h''$, carried on the shaft $b$ of the wheel B'.

The manner in which aforesaid gears transmit motion to the pulling-rollers F F, and turn them toward each other, will be obvious without further description here.

I I are corrugated feeding-rollers, mounted on central journals, and have pinions $i$ at their lower ends, which gear with the pinions $f'''$, and receive motion toward each other therefrom.

It will be seen that these feeding-rollers I seize the stalk as it is approached by the machine, and hasten it toward the rollers F, and that the spirally-grooved forward ends of the rollers F hasten it back to the operating parts of the pulling-rollers before the forward motion of the machine can draw the stalk from the ground, thus pulling the ear with certainty before the stalk can be itself pulled from the ground. The enlargements $f$ on the rollers F will aid in breaking the ears from the stalks.

J J are gathering-wheels, set at an incline, as shown in the drawings, and carried in bearings in the ends of arms $j\ j'$. The arms $j'$ form guards to direct the stalks to the rollers I. Each wheel J is provided with projecting lifters, which serve to raise the fallen stalks which incline over toward either side. K is a shaft, with a pinion, $k$, gearing with the pinion $g$. L L are carriers, one on each side of the machine, separated from the rollers F by guides $l\ l$, and pass over pulleys on the shaft K, from which they receive motion.

The lower ends of the carriers L give motion to pulleys $l'$, which in turn, by a cord, $l''$, give motion to the pulleys $l'''$, and thus to the wheels J J.

Letters M represent the husking-rollers, two in each series, and receive motion from the pinion $g$ by suitable gear-wheels $m\ m$. The rollers M are grooved annularly, as shown in the drawings, and the guides $l\ l$ extend back over them, as shown at Fig. 1, in such manner that the ears, as they are pulled from the stalks by the rollers F, will be thrown over upon the carriers L L, and by them elevated and thrown upon the elevated ends of the husking-rollers M, in passing down and over which they will be stripped of their husks in the ordinary manner. N is an elevator for carrying the husked corn to an accompanying wagon or other receptacle. It consists of an elevator-casing, $n$, to which another, $n'$, is hinged at $n''$, so it can be turned up out of the way, as shown at Fig. 8 by dotted lines. $n'''$ are the elevators, receiving motion from a shaft, $p$, which gears with a pinion on a shaft, P, which in turn gears with a pinion on the shaft H, and receives motion therefrom.

The operations further than those already described are deemed obvious.

I claim—

The gathering-rollers J, provided with lifters, and arranged to operate with the feeding-rollers I and pulling-rollers F, substantially as described, and for the purpose specified.

WILLIAM T. ORR.

Witnesses:
  J. J. TUNNICLIFF,
  W. B. RICHARDS.